Oct. 31, 1950 — T. K. SHARPLESS ET AL — 2,528,394
ELECTRONIC REMOTE CONTROLLED REGISTERING SYSTEM
Filed Sept. 15, 1948 — 5 Sheets-Sheet 3
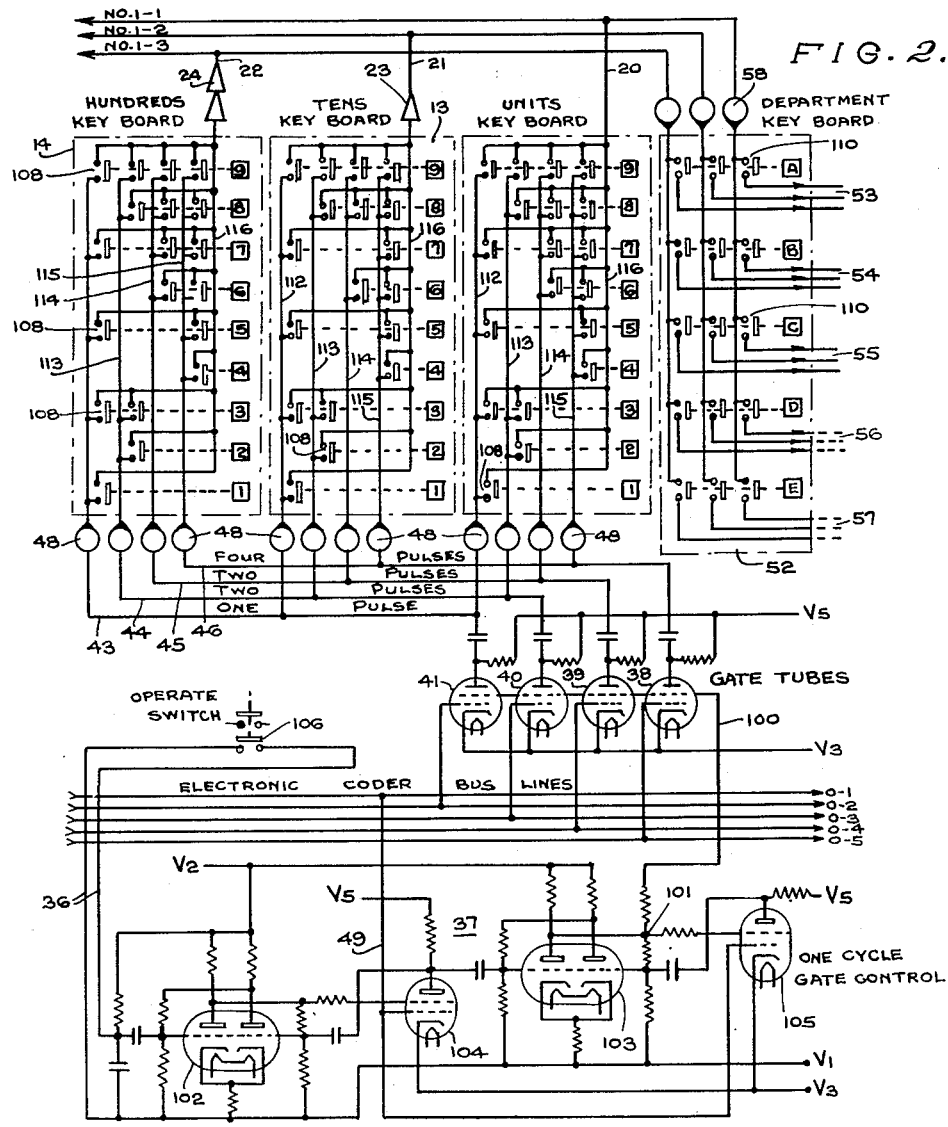
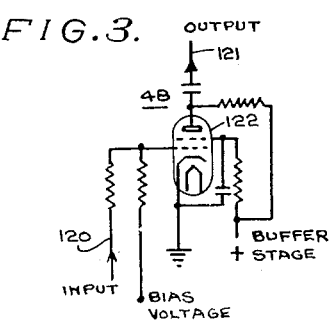
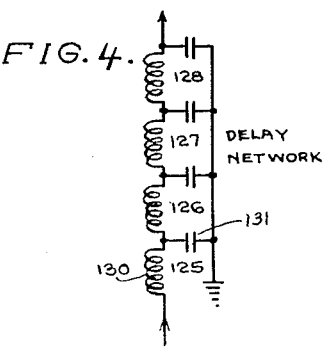
INVENTORS
THOMAS KITE SHARPLESS
BY EDWIN STUART EICHERT
ATTORNEY Oct. 31, 1950 T. K. SHARPLESS ET AL 2,528,394
ELECTRONIC REMOTE CONTROLLED REGISTERING SYSTEM
Filed Sept. 15, 1948 5 Sheets-Sheet 4

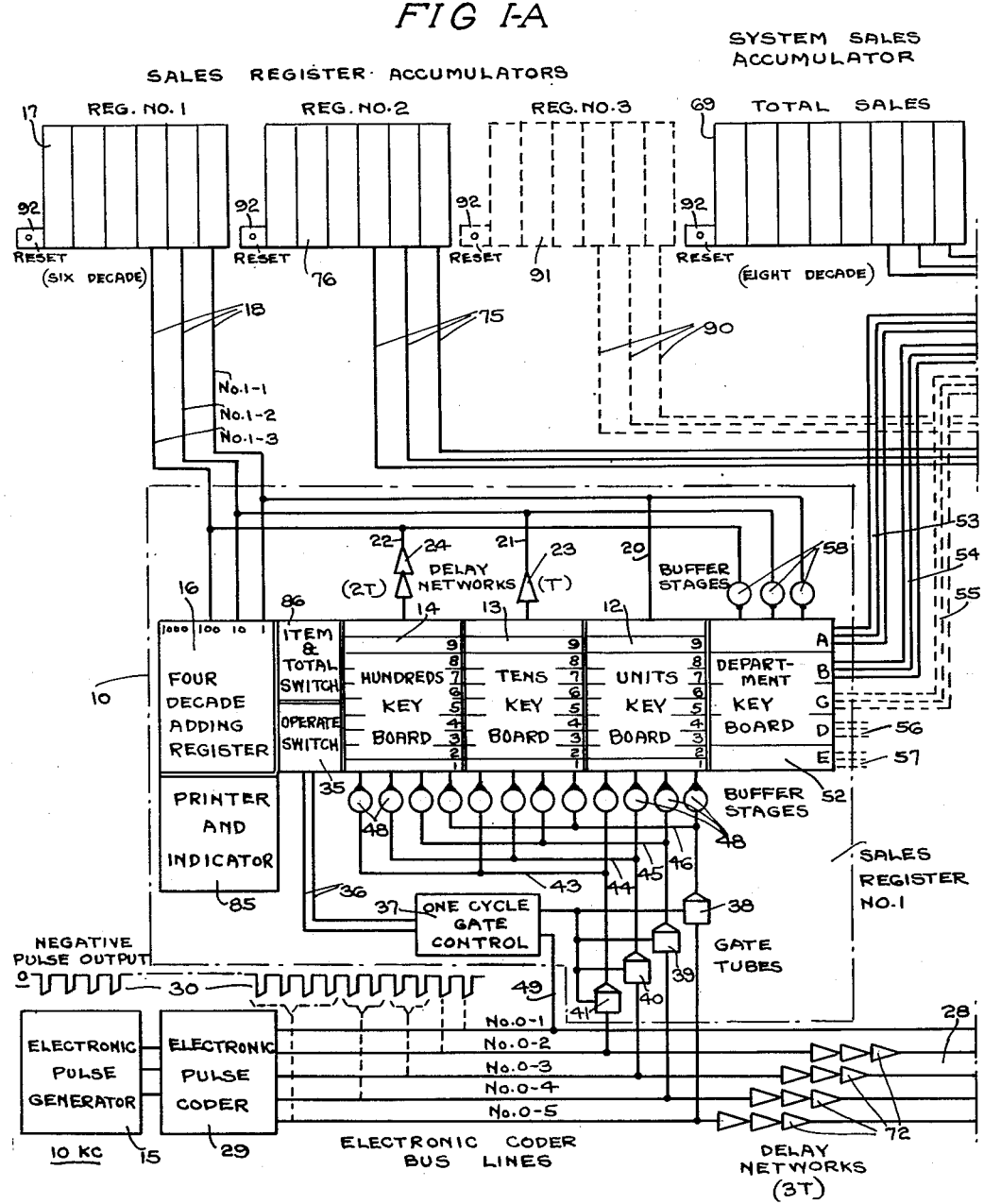

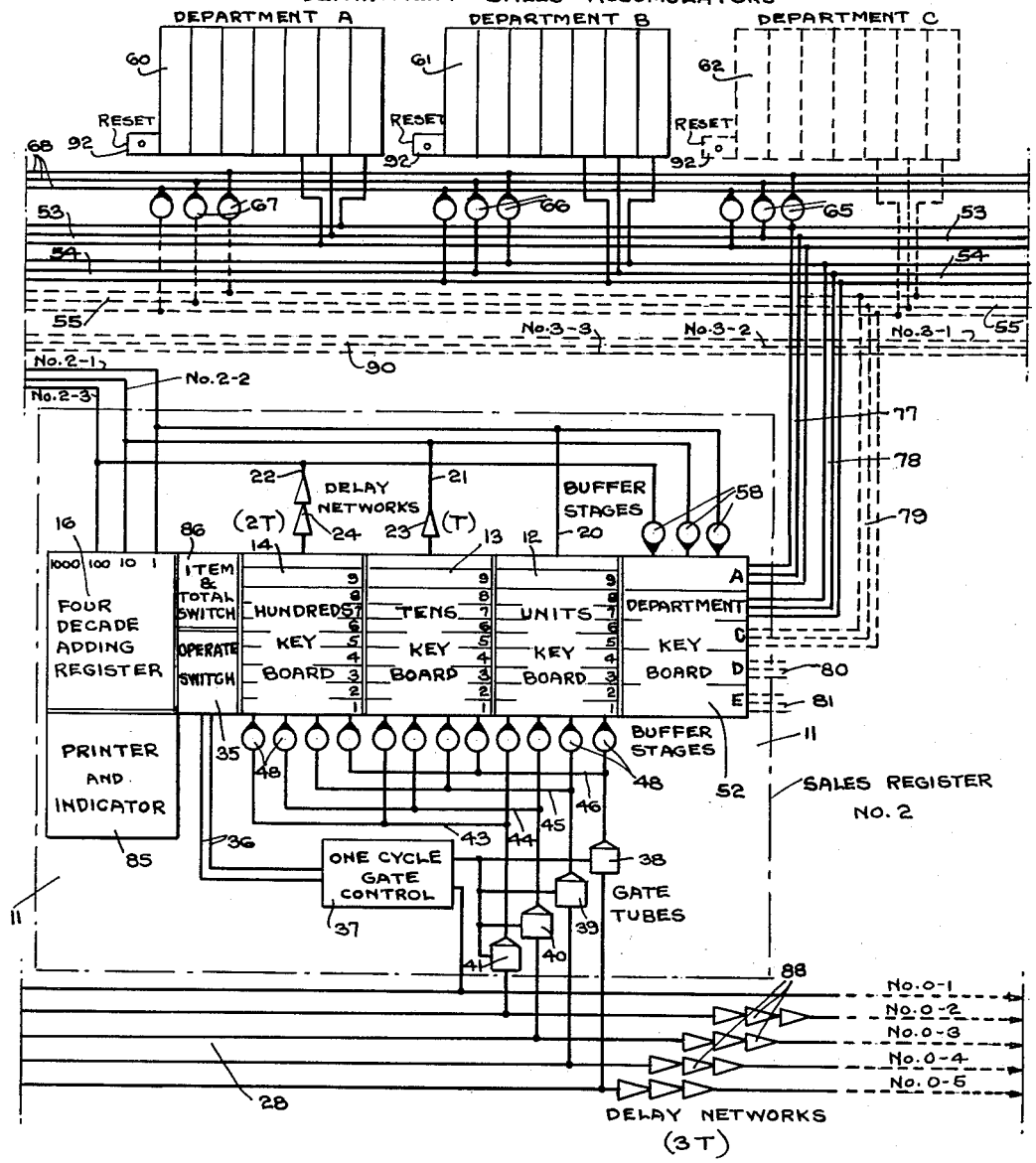

INVENTORS
THOMAS KITE SHARPLESS
BY EDWIN STUART EICHERT
ATTORNEY

Patented Oct. 31, 1950

2,528,394

UNITED STATES PATENT OFFICE 2,528,394

ELECTRONIC REMOTE-CONTROLLED REGISTERING SYSTEM

Thomas Kite Sharpless, Haverford, and Edwin Stuart Eichert, Springfield, Pa., assignors of two-thirds to Bernard Z. Rose, Philadelphia, Pa., and one-third to Technitrol Engineering Company, Inc., Philadelphia, Pa., a corporation of Pennsylvania Application September 15, 1948, Serial No. 49,384

14 Claims. (Cl. 235—92)

The present invention relates to an electronic remote control system for numerical registering and counting, and more particularly to a system of the type referred to, wherein a series of digits comprising a number, and decimals thereof, may be recorded and accumulated in response to operation of remote selection means, such as a keyboard. Such systems may include electronic numerical accumulators or registers for transmitting and recording selected numbers representing definite quantities of goods, values, operations, and the like, and which may be keyboard controlled, the keyboard including selector keys for a plurality of digit columns, for registering any series of selected numbers, including decimals.

It is a primary object of this invention to provide an improved electronic remote control system for numerical registering and counting, which is adapted for high speed operation whereby a plurality of transactions may be accomplished simultaneously and recorded and accumulated at one or more central remote locations from a plurality of operating keyboards or registers.

It is a further object of this invention, to provide an improved electronic remote counting and registering system of the character referred to, which may utilize high speed electronic pulses and electronic tube counters or accumulators of improved design adapted for the transmission of pulsed signals to the accumulators with a minimum of circuits and equipment and without causing interference in the registration of simultaneous operations.

It is a further and important object of the invention, to provide an improved electronic remote registering system of the character referred to, which is adapted for the registration of cash transactions and other operations in large stores or markets having a plurality of remotely located departments from which total sales or operations are desired to be accumulated in one central location for information of management.

In large markets, for example, it is desirable to provide a system for recording and accumulating, at some central point, the cash transactions at a number of other points or departments, according to department or class of goods, as well as total sales. It is, therefore, a still further object of the invention to provide an electronic remote registering system for large markets, department stores and the like, for registering continuously and accumulating cash transactions from any desired number of cash register positions provided with the usual features for printing sales coupons, in addition to visual display of each sale, and for totaling the sales progressively in a series of remote accumulators of the electronic counter type which receive information from each register and accumulate the totals at any desired location.

In such a system, it is desirable to provide (1) total sales for each register, (2) total sales for each of any number of departments, and (3) total sales for all departments, or the store or market total. In accordance with the invention by utilizing a relatively high frequency electric pulse distribution system and electronic accumulators of the ring counter type, and suitable keyboard controls, all transactions may be made rapidly, and a plurality of transactions may be recorded substantially simultaneously with a minimum of equipment.

The time for recording and relaying information is dependent upon the number of cash register positions, which may be designated as N. In accordance with the invention, for a ten-register system, the time for any or all registers to record an item or sale and relay the information to a centrally located accumulator, may be as short as three one-thousandths of a second, whereas the visual display and printing operations may require one-half second. If N is increased to 100, it may require only three one-hundredths of a second for recording and relaying the information for any cash transaction. Hence, it will be seen that the electronic system may be adapted to high speed recording of multiple operations.

In accordance with the invention, furthermore, the numerical registering system may include (1) the cash register or keyboard, (2) the accumulators, each comprising a plurality of decade counters, (3) the number transmission system, and (4) the pulse generating and distribution system.

The cash registers may comprise five main subdivisions including, first, an adding register, comprising an electronic counter having a required number of decades for indicating and accumulating any number to the desired number of digits, which receives electrical impulses from a keyboard corresponding to a given system and adds them to those previously received, thereby keeping a running total. In this respect it is similar to the central accumulators or counters except for the number of decades employed.

Secondly, the keyboard itself may consist of as many columns as are desired for a numerical count to any number of digits, and in the case of a cash register includes three or more columns covering units, tens, hundreds, thousands, corresponding to cents, dimes, and dollars, etc. The keyboard, when set, switches the proper number of impulses from the signal source into the first three or more decades of the adding register. These numbers are made up of a suitable combination of digit pulses totaling nine in the decimal system, and in accordance with the invention, are supplied through a four-wire distribution system in a series of one, two, two and four digit pulses derived from a pulse generator and distribution source.

Thirdly, a gating system is provided for delivering to the electronic counting system a predetermined number of pulses, such as ten for each operation, the gating system preventing the repeating of any selected number. The gating system, which may be called a one-cycle gate, is operated by the keyboard operating bar and allows only one group of the digit pulses to pass through the keyboard to the adding register. In addition, the same selected and gated pulses are sent out over the number transmission on system to remote points including central accumulators, as well as department total accumulators, in a cash register system of the type for which the invention is particularly adapted.

Fourthly, the pulse distribution system through the cash register or keyboard unit must provide for the delay of certain of the pulses, in order that at the accumulators the selected pulses may arrive in predetermined sequence for proper operation of the accumulators. To this end, time delay networks are utilized in the system at various points, such as at each register or keyboard, and between keyboards or registers, in connection with a common bus or distribution line from the pulse source.

It is, therefore, a still further object of the invention, to provide an improved electronic remote registering system for numerical counting and the like, which is particularly adapted for use as a cash register system for large department stores and markets, wherein high speed electronic counting may be utilized to advantage for remote selection and accumulation of totals in various classifications as desired, from a common pulse distribution system, without interference with the operation of the electronic counting means resulting from simultaneos operations at a plurality of remote points or cash register positions.

It is also a further object of the invention to provide an improved pulse coding and distribution means in a system of the character referred to, which enables a maximum number of operations and operating points to be utilized with a minimum number of cable connections.

The accumulators or decade counters, in accordance with the invention, may all be similar in construction, including a minimum number of counter circuits and tubes provided with illuminated indicators. A different number of decades are used at various points to perform suitable decimal place classification. In the case of the registers or keyboards, as used for example in a market system for registering individual cash transactions, four decades providing for registration of totals up to ninety-nine dollars and ninety-nine cents is sufficient. For the other accumulators or counters, a total number of six decades may be provided for a register for totals up to, but not including, ten thousand dollars. For department or merchandise classification, the total comprising seven decades may read up to, but not including, one hundred thousand dollars, and a store or market total comprising eight decades may read up to, but not including, one million dollars.

Where printing is not necessary, although an indicator-printer exactly like that of an ordinary cash register may be used, in the interests of economy and quietness as well as speed, the numbers in each accumulator may be made to appear as an array of lighted windows, the windows being arranged as a grid, the vertical lines of which each read from 0 to 9, and as many rows being provided as are desired for the total number to be indicated, but in any case, one vertical row for each decade in the accumulator. The accumulators may be made up of any suitable number of decade counters of the type now commonly known and used in electronic counters and other high speed counting applications. Such counters can easily be made to count reliably at least 100,000 counts per second, and it is this high speed which enables a system in accordance with the invention to operate with no waiting time at each keyboard or cash register.

Further, in accordance with the invention, each of the first three decades of any counter series receives pulses equal in number to the digit in its corresponding column. For example, in recording and adding 4.98, the units decade receives eight pulses, the ten decade receives nine pulses, and the hundreds decade receives four pulses. Carry over from one decade to the next is achieved by direct connection. No interference is encountered because the time delay networks allow no pulse to apear simultaneously on the units, tens, hundreds or other decade of any accumulator.

The common transmission system comprises various cables leading from the keyboards or cash registers to the central accumulators. Each cable consists of three wires, one for the units, one for the tens, and one for the hundreds units, although additional wires may be provided for further digit transmission in the thousands and other columns simultaneously. For each cash register or keyboard, one such cable extends to its corresponding total accumulator, making N cables. Also there is one such cable for each department or merchandise classification accumulators which connects to each keyboard or cash register, making a grand total of N (k+1) three-wire cables running from the registers or keyboards to the central office or accumulator location.

In addition, a further portion of the transmission system includes a connection from each of the department or sub-accumulators to a total accumulator for the market, store or system. This connection is buffered to prevent the signals into one department or sub-accumulator from feeding through the common connection into another accumulator.

The pulse distribution system in accordance with the invention is further arranged to produce control and digit pulses and to distribute them to the keyboards or registers on a minimum number of circuit leads, presently contemplated as five in number and, in addition, a coder or commutator device is provided for imparting to the distribution system a predetermined coding of the pulses, based upon a series of ten, one of which is an operating pulse and the remainder of which are counter pulses for applying to the decades one to nine pulses arranged in groups of one, two, two and four. It will be seen that combinations of these groups will produce consecutively all of the series of the digits from one to nine.

To avoid interference during carry-over in the adding register and accumulators, it is necessary to prevent any decade from receiving pulses simultaneously with another. In addition, to prevent erroneous recording at the central accumulators, it is necessary that no pulses from different registers arrive simultaneously at their input terminals. The worst situation is when all registers or keyboards might be recording numbers or sales into the same department or sub-accumulator at the same time. For this reason, it is necessary to impart to the system at various points, predetermined delays in the transmission of the pulses, by means of suitable delay networks. This may be termed pulse phasing and is accomplished as follows:

Considering $T$ as the minimum time for a count in a decade counter, the closest that the pulses can be spaced at the input tube and accumulator decade is $T$. At a counting rate of one hundred thousand per second, $T$ equals ten microseconds. For carryover to occur without interference in an adding register or decade counter, the pulses arriving at the tens decade must follow the corresponding pulses in the units decade by a time interval $T$. At the hundreds decade, they must arrive $T$ seconds after the tens decade, or $2T$ seconds after the units decade. This is achieved by inserting proper time delay elements between the keyboard and the first register or accumulator.

To meet the second condition mentioned, $3T$ second delays are placed in each of the digit pulse lines between keyboards or registers in connection with the main bus line from the pulse generator and coder, to assure that any pulse enters the same register or keyboard at least $3T$ seconds after it has entered the common transmission system from the previous keyboard or register. In order to prevent a pulse from another of the digit lines from arriving at another register or keyboard simultaneously, the time between pulses must be $3T$ times the number of registers or keyboards, or $N \times 3T$. This means that only one of the digit pulses is on the digit lines at any one time.

The pulse time and the digit cycle, or time for one operation of any or all registers or keyboards may be considered for a ten-keyboard system. Assuming $T$ is ten microseconds, and $N$ is ten, and that ten pulses are required for a digit cycle, the pulse time is then $N \times 3T$, or three hundred microseconds, or three ten-thousandths of a second. A digit cycle is ten times this, or three thousand microseconds, that is, three-one hundred thousandths of a second.

From the foregoing consideration of an electronic remote registering system for numerical counting and the like, in accordance with the invention, it will be seen that any desired number of keyboard stations, such as cash registers, may be provided and remotely located with respect to each other and with respect to a central accumulator or accumulators, and interconnected and operated through a simplified transmission and control system, the operation of which is based upon the proper buffering of the connections between accumulators, proper time delays in the digit lines from any keyboard, and between each keyboard and the main pulse supply bus, as well as upon the proper coding and gating of control pulses. The invention, together with further objects and advantages thereof, will, however, be better understood from the following description when considered in connection with the accompanying drawings, and its scope will be pointed out in the appended claims.

In the accompanying drawings:

Figures 1A and 1B are portions of the same figure, showing a schematic circuit diagram of an electronic remote control system for numerical registering and counting, embodying the invention;

Figure 2 is a schematic circuit diagram of a portion of the system of Figure 1, illustrating further details of the invention;

Figures 3 and 4 are schematic circuit diagrams of certain circuit elements of the system of Figures 1 and 2, showing the electrical components thereof;

Figure 5:
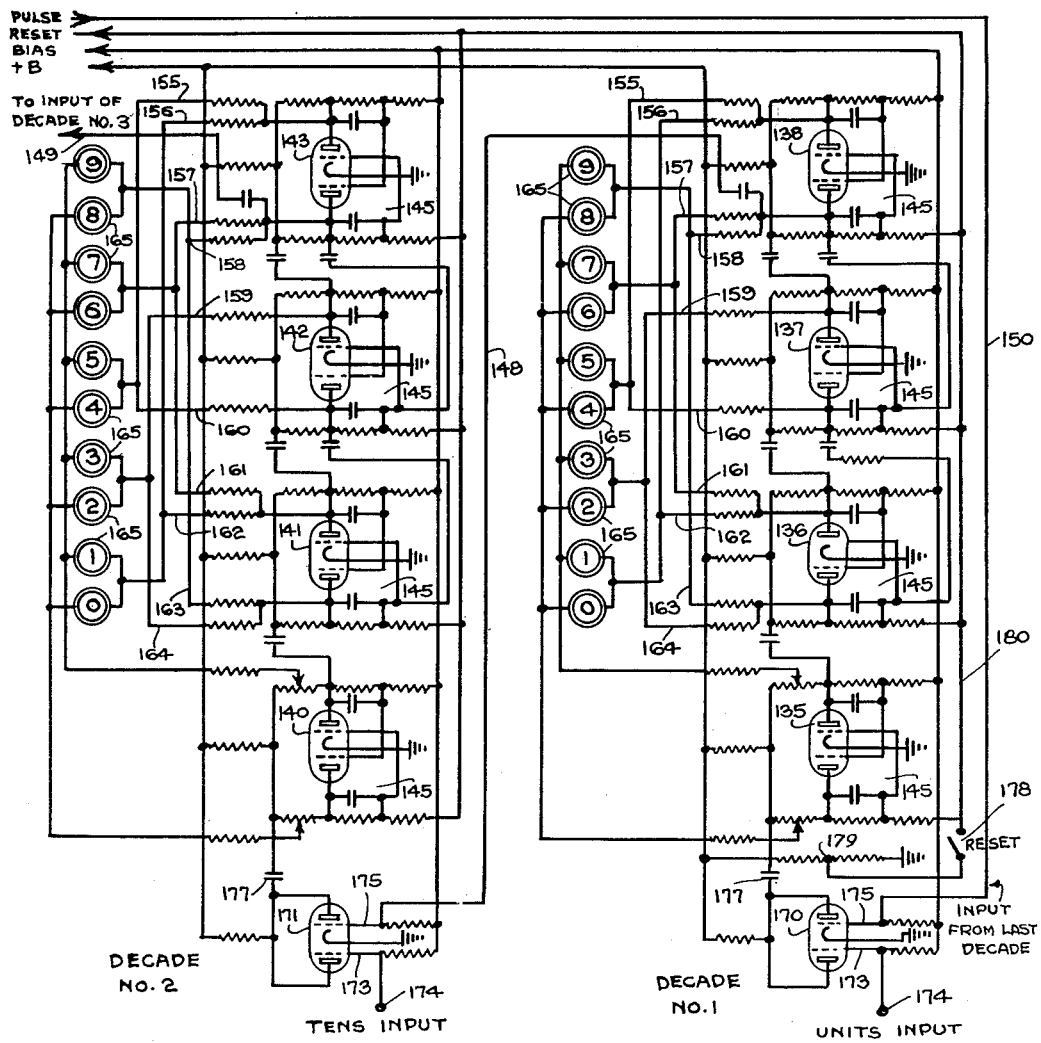
Figure 5 is also a schematic circuit diagram of a portion of a decade accumulator forming part of the system of Figures 1A and 1B embodying the invention.

Referring to Figures 1A and 1B, in which like circuit elements and circuits are designated by like reference characters, two of a series of keyboard stations or sales registers for a multiple unit electronic registering system are shown within the dot and dash lines 10 and 11. In the present example, for the transmission or registering of sales, each register is provided with a series of keys in three columns, comprising a units keyboard 12, a tens keyboard 13 and a hundreds keyboard 14, for recording cents, dimes and dollars, or a series of numbers for any purpose, from 1 to 9 in each column, as indicated. Each of the keyboards and the individual keys thereon control switching arrangements, hereinafter shown and described, for transmitting a predetermined series of pulses from an electronic pulse generator 15 to a plurality of electronic tube counter circuits, each comprising a plurality of decades. In connection with the keyboards 12, 13 and 14, a local or adding register 16 comprising a four-decade counter is provided within the station or register, and an accumulating register 17 is likewise provided in connection therewith, through a three-wire cable 18 comprising three bus wires 1—1, 1—2 and 1—3 as indicated.

The output of the units keyboard is connected to one of the bus lines 1—1 through an output conductor or lead 20, the tens keyboard is connected to another of the bus lines 1—2 through a second output conductor 21, and the hundreds keyboard is connected to the bus line 1—3 through a third output conductor 22. A time delay network, indicated at 23, is provided in the output lead 21, providing a certain time delay of $T$ seconds, and likewise a time delay network 24 is provided in the output lead 22, having a time delay of $2T$ seconds, for purposes which will hereinafter appear. It will be seen that both the four-decade adding register 16 and the accumulating register 17 are connected to the bus lines in parallel, so that pulses transmitted through the keyboards are applied to both registers simultaneously. The local register provides only four decades, as it is intended for indicating sales or totaling sales or numbers over a limited period, with a limited value for each individual sale, whereas the register 17 is provided with six decades for indicating a larger number of sales with a total number of digits to six places.

The pulses from the electronic pulse generator 15 are applied to each keyboard through an electronic coder bus line 28, comprising five leads 0—1, 0—2, 0—3, 0—4 and 0—5, and are connected to the generator through an electronic pulse coder 29. The electronic pulse generator 15 may be any type of square wave or pulse oscillator well known in the art, or it may be a conventional multi-vibrator circuit operative to provide a continuum of rectangular pulses at a suitable repetitive rate. The pulse coder 29 is essentially an electronic distributor, such as is disclosed in our pending application Serial No. 29,324, filed May 26, 1948, which transforms or commutates a series of negative pulses, indicated diagrammatically above the generator at 30, into a coded pulse arrangement comprising ten negative pulses applied to the different bus lines as indicated, the first pulse being applied to the line 0—1, the second pulse to the line 0—2, the third and fourth pulses to the line 0—3, the fifth and sixth pulses to the line 0—4, and the last four pulses to the line 0—5, making a total of ten pulses. This coding of the pulses is repeated continuously, so that on the eleventh pulse the line 0—1 again receives the output of the generator.

The frequency of the pulses may be of any desired value, preferably between ten and one hundred kilocycles, the pulse frequency in any case being of a value consistent with the considerations discussed hereinbefore. It may be considered, by way of example, that the output of the generator 15 is set at ten kilocycles. The electronic pulse coder may be of any suitable type for diverting the pulses to the various lines as shown, and for the purpose of transmitting a series of ten pulses, for decimal control of a register system, five lines are at present preferred, as shown, for the reason that this provides a minimum number of connections and a maximum number of combinations of pulses for control by the keyboards to set up any desired number of pulses from 1 to 9 through any individual keyboard column. That is to say, any individual number of pulses from 1 to 9 may be provided by the proper selection of the available pulses on the four pulse lines 0—2 to 0—5, inclusive.

The line 0—1 provides a single pulse, which is a controlling pulse for operating a gating or controlling system for applying a series of nine pulses to any one keyboard upon actuation of an operating switch or button, indicated at 35. This closes a circuit 36 controlling a one-cycle gate control system, indicated at 37, and in turn opens a series of gate tubes indicated diagrammatically at 38-41, inclusive. Each of the gate tubes is connected directly between one of the lines 0—2 to 0—5, inclusive, and a series of four keyboard bus wires 43–46, inclusive, to which each of the keyboard sections 12, 13 and 14 are connected through suitable buffer amplifier stages indicated at 48, one buffer stage being inserted between each of the bus lines 43–46 and a keyboard.

With this arrangement, upon operation of the switch 35, the one-cycle gate control receives the gating pulse from the line 0—1 through an input lead 49 and opens the gate tubes to apply to the keyboard sections a series of nine pulses. Upon the eleventh pulse, again received through the control line 0—1, the one-cycle gate control is operated to cut off the gate tubes. This insures that, for any set-up of the keyboard for registering a number, the number will be registered but once on the registers 17 and 16.

Also connected with the bus lines 1—1, 1—2 and 1—3 from the keyboard controls, is a third keyboard 52, having a plurality of keys numbered A to E, inclusive, in the present example. Each key is provided with three output leads as indicated at 53 to 57, inclusive. Suitable buffer amplifier stages 58 are connected between the bus lines 1—1, 1—2 and 1—3 and the keyboard 52 to prevent pulse interaction between the separate lines and to prevent feedback to pulses from the circuit leads 53–57, as will be seen from the further description which follows.

The keyboard 52 is provided for transmitting the pulses corresponding to each number set up on the keyboards 12, 13 and 14 to other points remote from the cash register or keyboard, whereby a running total may be accumulated according to each class of figures set up, such as classes of merchandise, or departments, in a store or market registering system, as in the present example.

For this purpose, the leads 53, being a continuation of the bus lines 1—1, 1—2 and 1—3 through the keyboard control A, extend to a remote point as indicated and are connected to a department decade accumulator indicated at 60, comprising any suitable number of decades, such as, seven in the present example. Likewise, the leads 54 are extended remotely to a centralized location in a similar manner, and are connected to a department accumulator 61, comprising a similar number of decades. In a similar manner, the leads 55 may be extended as shown, and connected to a third department accumulator 62. For the purpose of simplifying the drawing, the remaining lines are shown not connected, since they are likewise connected in operation to similar accumulators located at a central location for ready inspection and for providing management with totals by classes of merchandise or departments, or in any other manner determined in connection with the use of the selector keyboard 52.

It will be noted that each of the department bus lines 53, 54 and 55 are connected through buffer amplifier stages 65, 66 and 67, respectively, with a common bus line 68 for a main or system accumulator 69 for the total numerical count or total sales in the present example comprising a suitable number of decades such as eight, as shown. The buffer stages prevent pulses from one department line being fed back to the other through the common bus connection 68. The details of the type of buffer stage employed will hereinafter be described.

The second keyboard station, or cash register 11, is similar in all details to the first unit 10, and like parts therein are designated by the same reference numerals for identification, and operate in the same manner as described for the unit 10, with the exception that the gate tubes 38–41, inclusive, and the one-cycle gate system are connected to the electronic coder bus lines 28 at a point thereon, which is separated not only physically from the point of connection of the first gate tubes for the station 10, but also electrically, by a series of electrical time delay networks 72 in each of the lines 0—2, 0—3, 0—4 and 0—5. These delay networks provide a delay in each of the pulse lines equal to at least 3T seconds, or in any case T seconds more than the highest delay provided in the outgoing lines from the first keyboard station 10. With this arrangement, the signals applied to the outgoing lines from the second keyboard station 11 are always delayed T seconds longer than any of the pulses transmitted by the first keyboard station 10 for reasons which will appear from the following consideration of the further connections with the department accumulators through the second keyboard 11.

It will be noted that the output lines 2—1, 2—2 and 2—3 of the second keyboard or register are connected through leads or a cable 75 to a register of accumulator 76 for the second keyboard 11, and are also connected through buffer stages 58 to the department keyboard 52 in the same manner as for the keyboard station 10. Each of the department keys A–E is provided with output lines 77–81, inclusive, which are connected in parallel with the corresponding lines on the first keyboard station 10, and in the present example being shown with the lines 77 connected to the lines 53, the lines 78 connected with the lines 54, and the lines 79 connected with the lines 55. With this arrangement department totals from any keyboard may be applied to the department accumulators 60, 61 and 62 and to other similar accumulators, not shown, which may be connected with the lines 80 and 81 in parallel with the leads 56 and 57. These connections are omitted for the purpose of simplifying the drawing, as they are duplicates of the connections shown for the accumulators under consideration.

It will thus be seen that by delaying in the distribution system, the pulses applied to the second keyboard 11, the numbers to be registered through the keyboard 11 will be applied to the accumulators successively following the numbers applied through the buffer stages to the keyboard of the first register 10, and, therefore, there will be no interference between the various pulses and the proper recording of the totals for simultaneous operation of any number of keyboards.

In connection with each of the keyboard stations or registers, any suitable printer or indicator may be provided, as shown at 85, and likewise, total switches 86 may be provided for operating the same. However, as such portions of the keyboard station or register do not concern the invention, the same are not further illustrated or described.

Following the connections for the second keyboard station or register 11, a second set of delay networks 88 is provided in the operating lines 0—2 to 0—5, inclusive, of the electronic coder bus lines, so that to a succeeding register or keyboard station (not shown) a further delay of 3T seconds is provided for pulse signals therefrom when applied to the various department and system total accumulators, whereby such signals or pulses are likewise received by the various accumulators successively, following the reception of pulses from the first two keyboard stations or cash registers, thereby preventing the reception of more than one pulse at any instant at any accumulator input and permitting simultaneous operation of a plurality of keyboards or cash registers.

Output lines from a third keyboard station or register (not shown) are indicated by cable connections 90, comprising three output leads 3—1, 3—2 and 3—3 leading to a third register accumulator 91.

The operation of the system thus far described is as follows: With the electronic pulse generator 15 energized, pulses substantially two microseconds in length and at a frequency rate of ten kilocycles are applied to the electronic pulse coder which divides each series of ten pulses according to the diagram 30, in connection with each of the five electronic coder bus lines, as indicated.

To transmit any number such as a number representing the amount of a sale, for example, the proper units, tens and hundreds key is depressed to set up the desired number. This operation of the keys selects connections through each section of the keyboard with one of the four keyboard bus lines 43–46, inclusive, to transmit the corresponding number of pulses to the outgoing lines 20, 21 and 22. The gate tubes are opened when the operating switch or key 35 is depressed, causing the one-cycle gate control to operate the gate tubes to permit the pulses to pass to the keyboard bus lines above referred to, and thence through the buffer stages and keyboards to the lines 20, 21 and 22, the selected number of pulses passing to each line.

The pulses from the units output line 20 pass through line 1—1 and cable 18 to the accumulator 17, actuating the first section or decade of the accumulator to set up the resulting digit selected. The series of pulses corresponding to the selected number in the tens keyboard pass through the delay network 23 and the output line 21 to the output bus line 1—2 and thence to the second decade of the register 17, delayed T seconds in order that the units record and carry-over may be completed ahead of the reception of the pulses for setting up the tens indication in the second decade.

Likewise, the pulses through the hundreds keyboard, corresponding to the number selected, pass through the dual delay network 24 and the output lead 22, being delayed 2T seconds and passing through the output bus line 1—3, and are applied to the third decade of the accumulator 17, following the reception of the pulses from the tens keyboard, and delayed therefrom T seconds. Upon completion of the ten pulses and reception of the next pulse on the line 0—1, the one-cycle gate control operates and the gate tubes are closed off, thereby preventing a repetition of the number selected by the keyboards which are then restored to normal or open position after a short time delay. At the same time and in the same manner, the sale is set up on the register 16, which is connected effectively in parallel with the register 17. Also, by previous setting of the proper key in the department keyboard, the same pulses, delayed in the same manner, successively are applied through the buffer stages 58 to a selected one of the outgoing lines to the department and total sales accumulators, and arrive on the first, second and third decades thereof in the same manner as for the keyboard station or register accumulator.

As further numbers are set up and transmitted, the decades in the various accumulators progress to add or accumulate the totals until the end of a predetermined time, such as the end of the day, when they are read and reset either automatically or manually, as by reset controls or buttons, indicated at 92 for each accumulator.

Referring now to Figure 2, along with Figures 1A and 1B, further details of the keyboard switching arrangement and of the one-cycle gate, forming part of each cash register or keyboard station, will be pointed out and described.

The gate tubes 38-41, inclusive, are shown as pentagrid converter type tubes having first control grids connected, respectively, with the pulse lines 0—5 to 0—2, inclusive. The anodes of the tubes are coupled to the keyboard pulse lines 43-46 which in turn, as shown also in Figures 1A and 1B, are connected to the several keyboards 12, 13 and 14.

The second control grid of each of the gate tubes is connected to a bias control line 100, which is coupled to the output terminal 101 of the one-cycle gate control system 37 comprising two double triode tubes 102 and 103 and two pentagrid converter type tubes 104 and 105. The one-cycle gate control consists of a manually operated trigger circuit in connection with tube 102, which is set by the operate switch 106 connected with the control circuit 36 and operated by the operate switch key 35 shown in Figures 1A and 1B. When set, the trigger circuit opens a gate tube 104 allowing the control pulse on the bus line 0—1 to be applied through the input connection 49 to the second trigger circuit in connection with the tube 103, and changing the bias on the second control grid circuit 100 for the gate tubes, through its connection with the output terminal 101. This opens the gate tubes 38-41 and allows the digit pulses to pass from the line 0—2, 0—3, 0—4 and 0—5 to the keyboard 43-46, respectively, from which the pulses are applied to the outgoing lines 20—21 and 22 by the particular numerical combination set up on the keyboard, as will hereinafter be described.

The second trigger circuit also opens a fifth gate tube provided by the tube 105, which is connected to the line 0—1, so that the circuit will be reset, shutting off the gates when the next control pulse arrives. The first, or manually operated trigger is reset by the control pulse which sets the second trigger. It will thus be seen that the four digit line gate tubes are held open for only one cycle. The operated switch 106 sets the trigger circuit in readiness for the next coding pulse on the line 0—1, and the gate tubes are thus opened during the interval between the first coding pulse on the line 0—1 and the next coding pulse thereon, which provides for the reception of nine pulses. The nine pulses are applied to the four pulse lines 43—46, four pulses being applied to the line 46, two each to the lines 44 and 45, and one to the line 43. By making each digit pulse completely traverse the entire line of keyboards and their associated accumulators before the next control pulse appears on line 0—1, any confusion at the totalizing accumulator, as might occur in case an earlier register is reactivated before a cycle is completed through the subsequent registers, is completely obviated.

Referring now to the keyboard circuits per se, it will be seen that each of the numbered keys 1 to 9, corresponding to the similarly numbered key representations in Figures 1A and 1B, are connected to switches 108 having single, double, triple and quadruple contact units interposed in various combinations in circuit through the buffer stages 48 from each of the pulse lines 43—46. The arrangement may further be understood by tracing through certain of the circuits from the bus lines 43—46 to the outgoing lines 20, 21 and 22.

Considering, for example, the circuits of the units keyboard, when the No. 1 key is depressed a corresponding switch 108 is closed and provides connection with the single pulse line 43 through to the outgoing line 20. As soon as the operate switch is closed, the one-cycle gate will apply nine pulses to the various lines and the line 20 will receive a single pulse from the line 43.

If, instead, the No. 5 button is pressed to close the dual switch arrangement shown in connection therewith, both the pulse line 46 and the pulse line 43 will be connected to the outgoing line 20 and a series of five pulses will be delivered to the line 20, the line receiving first the one pulse from the line 43 as before, and subsequently the last four pulses of the cycle from the line 46, thus delivering to the line 1—1 a series of five pulses which will be applied both to the first decade of the register No. 1, indicated at 17 in Figure 1A, and to the first decade of the four decade adding register 16 in the cash register or keyboard station.

This same five pulse cycle will also be sent out through any one of the department lines for the first decade, depending upon which key is closed in the keyboard 52. For example, if the key A is depressed, a three-pole switch 110 will be closed and the outgoing pulse will be applied to the outgoing leads 53, and in this case to the first or upper lead thereof. Similarly, any other department key may be set and a similar switch 110 will be closed to apply the outgoing signal to any one of the lines 54, 55, 56 or 57 as selected.

Referring again to the keyboard switching arrangement, it will be seen that each keyboard comprises four switching lines 112, 113, 114 and 115, connecting with each of the switches 108 for the various keys, to provide the digit control necessary to apply to a fifth and outgoing line 116 for that keyboard, the number of pulses corresponding to the number on the keyboard. For example, when key No. 9 is closed in any keyboard, all four lines which are connected with the four bus lines 43—46 are connected to the outgoing line, thereby applying first one pulse from line 43, then two sets of two pulses from each of the lines 44 and 45, and finally the four pulses from the line 46.

All pulsing control follows the operation of the switch 106 which triggers the one-cycle gate control and causes the gate tubes to open. As pointed out hereinbefore, the next pulse on the line 0—1 will cut off the one-cycle gate and the gate tubes, thereby passing through the keyboard only one registering indication, as determined by the setting of the keys.

While any other suitable switching arrangement may be provided, the system shown is at present preferred, as being simple and effective. Likewise, the one-cycle gate arrangement provides a simple and effective circuit or system for applying to the keyboards a single series of pulses for any setting thereof, whereby a number to be registered is recorded but once on the accumulators.

The buffer stages 48 are interposed between certain of the circuits of the pulse distribution system, through which signals are to pass in one direction only, and may be provided by any suitable electronic tube amplifier circuit, such as shown in Figure 3 for example, comprising an input circuit 120 and an output circuit 121, coupled, respectively, with the input grid and output anode of a suitable screen grid amplifier tube 122, having the usual conventional circuit connections as shown.

Such buffer stages are shown at 48, 58, 65, 66 and 67 in the circuit diagrams. At the keyboards these buffer stages prevent the successive pulses from each of the bus lines 43—46 from being fed back to each other through the common output connections provided when certain of the switches are closed, as when the switch busses 112—115 are tied in common to a common output bus line 116 leading to the output lines. It will be seen that where no buffer stage is provided, a pulse on one line would immediately appear on all other lines connected therewith, prior to the arrival of the pulse from the coder or pulse generator, giving false numbering and operation of the decades.

The delay networks 72 and 88 in Figures 1A and 1B, as well as the delay networks indicated at 23 and 24, prevent the passage of pulses therethrough for a given time interval, such, for example, as ten microseconds, in order that the pulses may arrive at the decades of a given accumulator in proper sequence, as well as preventing the pulses from one keyboard or cash register from arriving at any accumulator at the same time as the pulses from another cash register or keyboard, as has been considered hereinbefore.

Such delay networks may be of any suitable form or type, and in certain applications may be provided by a simple ladder network comprising a series of stages, as shown in Figure 4 at 125, 126, 127 and 128, each comprising a series inductance element 130 and a shunt capacitor 131. As many stages are included in the network as are required to provide the desired time delay, which is in accordance with the formula $T=\sqrt{LC}$, where L is the inductance of each inductance element 130 and C is the capacity of each shunt capacitor 131.

In addition to the coding, gating, coordinated delays in the pulse distribution circuits, and the digit selecting system or keyboard, the final receiving element or elements of the system are the accumulators or registers comprising electronic counter circuits, many forms of which are presently generally known and used. One form of electronic counter which is particularly adapted for use in the system of the present invention is the so-called N-scale counter which is adapted for high speed pulse operation and may be provided with a plurality of output circuits for controlling indicating and other devices in connection with each stage thereof. Such counters are shown and described in an article by T. K. Sharpless appearing in the March 1948 issue of "Electronics" magazine at pages 122–125, entitled "High Speed N-Scale Counters."

Two decades of a suitable N-scale counter are shown in Figure 5, to which attention is now directed, as representing the first two decades of any of the accumulators shown in Figures 1A and 1B for receiving the outgoing pulses from the various keyboards and registers. Normally, an accumulator may consist of a multiple electronic tube circuit having ten similar basic units or electronic tubes, of which all units except one are "Off" or normal and one unit is "On" or in an abnormal state. Ten of these circuits together may form a ten-column counting device for permitting counting operations in connection with a ten-digit number, for example. Each accumulator contains normally ten decade ring counters. An accumulator, however, adds in all columns at the same time and requires for its operation only the time for its counter unit to count from 0 to 9, plus the time for carry-over to the next digit column. Normally nine pulses are required, which are of short duration and follow one another at short time intervals.

Referring to Figure 5, in the present system, N-stage counters are formed as described in the article referred to, using two triodes 135, 136, 137 and 138 per stage for the first decade, and a similar number of dual triodes 140, 141, 142 and 143 per stage for the second decade. The two triodes per stage are included in standard trigger circuits 145. Any number of decades may be used, such as from four in the register or keyboard station to eight in the decade 69 of Figure 1A. However, any practical number of decades may be used from two to fifty.

Each decade in the present example is a ten-stage electronic counter made up of four stages of binary, or scale of two, counters with six of the sixteen possible counts eliminated. Such electronic decade counters may be made in various forms, and for the purposes intended herein, the straight ten-count decade with two tubes in a trigger circuit for each stage is preferred.

In general, an accumulator as above noted is a counting device designed to receive its counting pulses at each decade simultaneously, and is capable of adding this count to any previous count stored in it. This being the case, any carry-over from one decade to the next is delayed until the digit pulses, that is, those representing a number or a count, have arrived. This is in order to prevent interference of the carry-over with any digit pulses.

In the present system, pulses do not arrive simultaneously at the input of any decade because of the phasing or timing of the digit pulses, as hereinbefore described, and thus carry-over may be made as indicated by the circuit connections 148 and 149 from one decade to the next and from the last decade to the input of the number of the next highest order, as indicated by the lead connection 150. The device is therefore called an accumulator, since the three decades, two of which are shown, receive their digit pulses within a known pulse time. This requires that the basic pulse rate be considerably lower than that of the maximum counting rate, for each decade. While in the present system the maximum counting rate of a decade may be as high as 100,000 per second, the pulse rate is lowered to 10,000 per second, thus allowing ten possible parallel input connections although only three are used in the present system, and are shown only by way of example as being representative of a usual number required in a system of the type described.

Besides the counting and accumulating decades, the accumulator is provided with voltage output circuits, one for each decade, as indicated at 155—164. These are shown in connection with ten indicators 165, which may comprise neon lamps which light up corresponding to the digit registration in that decade. In the adding register portion of the cash register or keyboard station, which is a similar circuit, these ten voltages at each decade may be utilized for other purposes, such as operating the printer and indicator system 85. However, as this does not form part of the present invention, the same is not described herein.

It will be noted that each of the first three digit decades, that is, the two that are shown, are provided with input amplifier stages 170 and 171. These each comprise a double triode having one control grid circuit 173 connected with the input terminal 174 for the decade, and having a second grid circuit 175 connected back to the preceding decade. In the case of the first decade, the input circuit is connected back to the last decade through the lead 150. Both anodes are coupled through a coupling capacitor 177 with the input to the first binary stage of each decade.

In addition, a reset switch 178 is provided, in connection with a positive source of potential 179, with a reset line 180 which is connected to all of the binary stages throughout the accumulator in each decade, so that upon closure of the reset switch all decades are brought to zero. In the centrally located accumulators this switch is manually operated, but in the adding register at the keyboard it is operated automatically or by the reset switch as desired. In Figures 1A and 1B, the reset switches are indicated at 92 for each accumulator.

Figure 7:
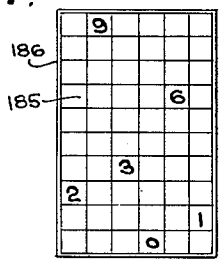
Figure 7 is a diagrammatic view of an indicator arrangement for certain portions of the counter of Figure 5.

The neon lamps, indicators, or other similar devices are preferably arranged in vertical rows, substantially as shown in Figure 5, and the lamps, furthermore, may be connected through extensions of the circuits shown, to an indicator board and arranged in parallel vertical rows in close proximity to one another in a numerical indicating board or grid, as shown in Figure 7, the lamps being located in rear of suitable translucent windows 185, arranged in vertical rows in a suitable frame 186.

Assuming a six place or six decade accumulator, of which the first two decades indicate digits and tens as decimals, the number shown recorded is 2930.61, and would call for the second, ninth, third, zeroth, sixth and first neon lamps to be lighted in each of the successive decades from the last to the first. It will thus be seen that a battery of accumulators may be located at or near a central point and the indicating lamps in turn may be banked at a central location for the information of management or for conveying numerical information to a central control point and arranged for easy visual observation in a system of this type.

The manner in which the pulses from the pulse generator and pulse coder are applied to the pulse lines 0—1 to 0—5, inclusive, is diagrammatically indicated in Figure 1A by the pulse diagram 30. A further consideration of this pulse grouping and arrangement, as well as its application in time sequence to the various distribution lines from the registers or keyboard stations, is diagrammatically shown by the graphs in Figure 6, to which attention is now directed.

Figure 6:
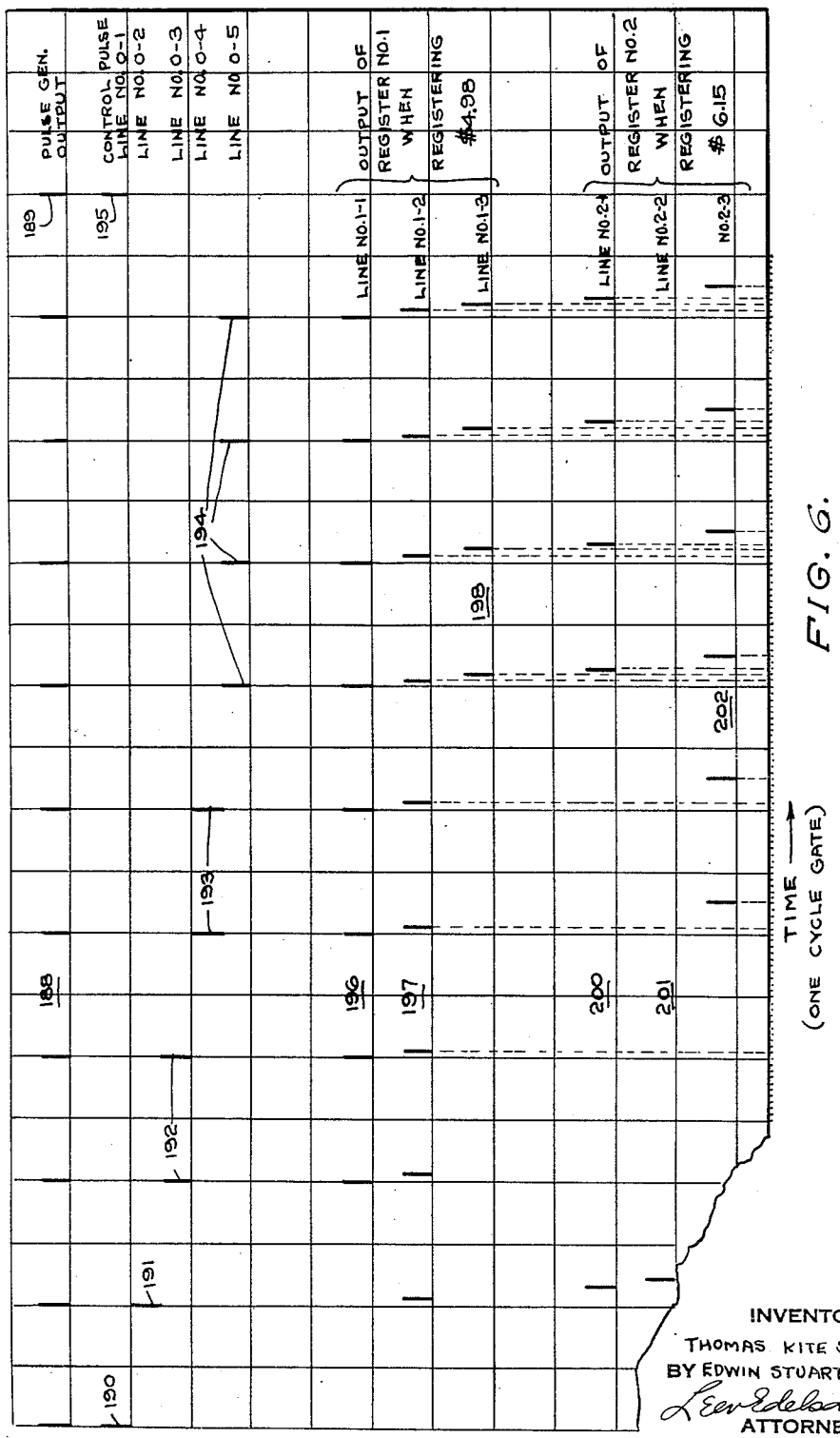
Figure 6 is a graph showing pulse diagrams illustrating certain operating characteristics of the system of Figures 1A and 1B.

In Figure 6, time, covering the length of a one-cycle gate, or ten pulses from the pulse generator together with one additional control pulse of a succeeding series, is shown in time spaced relation in the topmost line 188 of the upper pulse diagram. The first control pulse of the second series is indicated at 189. In the second horizontal line along the time axis, the control pulse on line 0—1 is indicated at 190 and corresponds in time position with the first pulse above in line 188. Likewise, the single pulse in line 0—2 is indicated at 191, following a predetermined time interval after the first pulse 190 and appearing only in line 0—2. In the next line, and following pulse 191 in time, are the two pulses 192 which appear on line 0—3. These are followed in equal time sequence by the second pair of pulses 193, which appear on line 0—4, and these in turn are followed by the four pulses 194 which appear on line 0—5. These nine pulses are permitted to pass between the time of the first control pulse 190 and the corresponding first control pulse 195 in the next series, thereby completing the gating of the nine cycle pulse for operation of the accumulators.

Referring to the center pulse diagram in Figure 6, the output of register or keyboard No. 1, that is, keyboard 10 in Figure 1A, for the lines 1—1, 1—2 and 1—3, is shown in time phase relation for registering, for example, the number 4.98 or, in a cash register system $4.98. Upon inspection of line 196, it will be seen that eight delayed pulses, provided by depressing key 8 of the units keyboard, in exact time phase with the pulse generator output, are applied to line 1—1 so that they arrive at the first decade of the selected department accumulator, the total sales accumulator, the sales register accumulator, and the adding register without delay.

In the line 197 the nine pulses provided by depressing key 9 of the tens keyboard are delivered to line 1—2 with a time delay of T seconds provided by the time delay network 23 in the lead 21, so that these nine pulses arrive at the second decade of the selected department accumulator, the total sales accumulator and the sales register accumulator, as well as the adding register, following the pulses applied to the first decade thereof by a time delay of T seconds.

Referring to line 198, in the same manner, in response to operation of the No. 4 key of the hundreds keyboard, four pulses are applied to line 1—3 of the cash register or keyboard, and thence to the third decade of the selected department accumulator, the total sales accumulator, the sales register accumulator and the adding register, being delayed 2T seconds by the delay network in the line 22. In this manner, each decade of each accumulator receives digit pulses in time sequence or proper phase relation to permit adding or accumulating in the total register without interference with the operation of the preceding decade.

Referring to the lower pulse diagram in Figure 6, in lines 200, 201 and 202 along the time axis, is shown the time phase relation of the pulses in the output of register No. 2, that is, register 11 in Figure 1B, for recording or registering the number 6.15 or, in the case of a cash register, $6.15. It will be noted that the pulses in the first lines 2—1, 2—2 and 2—3 in the output of the register are in spaced time or phase relation with the pulses from the preceding register, as indicated in lines 196—198 above, being delayed by a time interval 3T seconds with respect to the initial pulses indicated in line 196 as provided by the time delay networks 72 between the two keyboard stations or registers in the electronic coder lines 28.

In the second register output per se, the pulses are in time phase relation, or spaced by the time interval T, effected by the delay network 23 and the delay network 24, as in the case of the first register. It is also interesting to note that the digit No. 5 is made up of the four pulses on the line 0—5 and the one pulse on the line 0—2, and that in each case, the pulses are spaced or phased by the differential 3T. The tens digit is made up of a single pulse from the line 0—2, but is delayed in the second decade by the time interval T with respect to the first decade. In the same manner the third digit, representing the number 6, is made up of the four digit pulses in the line 0—5 and two digit pulses in the line 0—4. This number is set up in the second keyboard by depressing the keys 6, 1 and 5 in the hundreds, tens and units keyboard, respectively.

By reference to Figure 2, it will be seen how these pulses are derived through the keyboard circuits from the electronic coder bus lines and the keyboard bus lines, and finally through the keyboard bus connections and switches. These operations are shown only by way of example, to indicate the time phase relation of the pulses in the several supply and outgoing keyed circuits of the numerical counting and registering system.

From the foregoing description, it will be seen that the complicated registering and indicating operations from a plurality of transmitting stations may be relayed to centralized indicating and recording points at high speed, through a minimum of circuits, and without interference between simultaneous operations from a plurality of points in connection with a common source of pulses for the entire system, and that the control and operation of the system may be provided through the medium of a simple keyboard and switching means adapted for use in a cash registering system for large markets and stores, as well as for other purposes.

What is claimed as new and useful is:

1. In combination, a plurality of electronic decade numerical accumulators centrally located; a plurality of selective switching keyboards remotely located with respect thereto; a pulse coding system providing a cyclically repetitive pulse code; an electronic gate circuit connected with each keyboard to produce a single cycle output and series of pulses for each keyboard operation; a control switch at each keyboard for actuating said gate circuit; a pulse transmission system interposed between said gate circuits and said coding system; and pulse phasing and distribution circuits for applying pulses in timed sequence to said accumulators to register and accumulate numbers selected at the keyboards whereby various counting operations may be simultaneously initiated at a plurality of the keyboards.

2. The combination as defined in claim 1 wherein said electronic gate circuit comprises two trigger circuits and associated gate tubes operative in response to a coding pulse to produce said single cycle output and series of pulses for each keyboard operation.

3. An electronic remote control system for numerical registering and counting comprising, in combination, a plurality of high speed pulse distribution lines; pulse generating and distributing means for applying a coded series of electrical pulses to said lines in repetitive sequence; a plurality of keyboard control stations connected with said lines in parallel to receive coded pulses therefrom; an electronic gate interposed in each of said connections and responsive to operation of the associated keyboard station for accepting from the distribution lines one series of coded pulses for each operation thereof; a plurality of key controlled switches at each of said keyboard stations for selecting pulses from said transmission lines corresponding to a desired series of digits constituting a selected number to be registered; an output bus line from each keyboard station comprising a series of conductors for conveying therefrom the separate digit pulses of a selected number; a group of electronic decade accumulators each connected individually with the output bus line from each keyboard station; a plurality of totaling decade accumulators selectively coupled to the output bus lines from each of said keyboard stations for totalizing transactions in any one thereof; and electronic delay means interposed in each of said pulse distribution lines and in the output bus lines from the keyboard stations for controlling the pulse phasing at the accumulators, whereby simultaneous keyboard operation and numerical registering in predetermined sequence is provided.

4. An electronic remote control system for numerical registering and counting as defined in claim 3 wherein the output bus line from each of said keyboard stations is connected to an accumulator and is selectively key controlled and connected to a separate accumulator bus line, and wherein each of said accumulator bus lines is coupled to a totaling accumulator bus line.

5. An electronic remote control system for numerical registering and counting as defined in claim 3 wherein at each keyboard station the series of key controlled switches are arranged in numerical sequence in columns representing numbers according to the decimal system, with one column of keys and switches for each digit of a number; and wherein the pulses delivered through the pulse distribution bus lines comprise a single pulse on one bus line, two succeeding pulses on a second bus line, two additional succeeding pulses on a third bus line, and four final succeeding pulses on a fourth bus line, whereby a combination of key and switch controlled connections therewith effect a pulse output from each keyboard in any succession of consecutive pulses from one to nine inclusive for each digit.

6. An electronic remote control system for numerical registering and counting comprising, in combination, an extended electronic pulse distribution line having a source of coded pulses connected therewith at one end and including a series of delay networks interposed along said line; a plurality of keyboard stations including numerical pulse selector switches connected with said line between said source and the first of said delay networks and between each of the delay networks along said line; whereby each keyboard station receives a predetermined series of coded pulses in timed sequence; a plurality of electronic numerical decade accumulators each of which is connected with all of said keyboard stations to register and accumulate selected numerical pulses therefrom in sequence determined by said delay networks; and a delay network operatively associated with each of the keyboard stations, whereby numerical accumulation with correct carry-over is provided by said electronic numerical accumulators.

7. An electronic remote control system for numerical registering and counting as defined in claim 6 wherein each of said keyboard stations includes an electronic one-cycle gate circuit providing a selective connection for the pulse distribution line at each keyboard station and an operating switch for actuating said gate control circuit to apply to each keyboard station a single predetermined series of pulses for each operation thereof.

8. A multiple unit electronic remote control system for numerical registering and counting comprising, in combination, a pulse distribution line having a series of conductors each carrying a predetermined number of spaced electrical pulses in predetermined time sequence with one of said conductors carrying only a coding pulse; a plurality of keyboard stations each including a one-cycle gate control circuit connected with said one of said conductors for receiving the coding pulse and a plurality of key-controlled switches connected with the others of said pulse distribution conductors for receiving numerical counting pulses therefrom through said one-cycle gate control circuit; an operating switch at each keyboard station for actuating said one-cycle gate control circuit to apply to said keyboard station a predetermined series of pulses; and a plurality of electronic decade accumulators each connected with all of said keyboard stations for registering and accumulating series of numbers resulting from successive operations of said key-controlled switches at each of said keyboard stations.

9. A multiple unit electronic remote control system for numerical registering and counting as defined in claim 8, wherein additional decade accumulators and additional key-controlled switches are provided in connection with each keyboard station for selectively registering and accumulating the combined output of all of said keyboard stations in multiple; and wherein electrical delay networks are provided in said pulse distribution line between keyboard stations for applying the pulse output of each keyboard station in timed sequence to said accumulators.

10. In an electronic remote control system for numerical registering and counting, a plurality of keyboard stations each comprising a plurality of rows of numerical registering keys; a switch connected with each of said keys; a first, a second and a third output circuit connected respectively with each of the switches for each of the first, second and third rows of keys; a plurality of pulse input bus wires connecting, through buffer circuits, corresponding switches for each row of keys in parallel; an electrical delay network in said second output circuit providing a predetermined time delay T; a second electrical delay network in the third output circuit providing a predetermined time delay 2T; a gate tube connected with each of said bus wires for the parallel connected rows of keyswitches; a pulse distribution system comprising a plurality of pulse supply conductors connected through said gate tubes with said key switch input bus wires and including a coding pulse supply conductor; a control circuit for said gate tubes connected with said coding pulse supply conductor; a source of coded pulses connected with said pulse supply conductors; and a third electrical delay network connected in series with said conductors between keyboard stations providing a predetermined time delay 3T, the letter T representing a unit of time.

11. An electronic remote control system for numerical registering and counting comprising, in combination, a plurality of electronic decade accumulators; a plurality of keyboard stations remotely located with respect thereto and in spaced relation to each other; an electronic pulse generator; a coding device for said pulse generator having a plurality of output circuits extending along and between said keyboard stations, said output circuits having operatively associated pulse delay circuits and being connected with said keyboards in parallel for applying thereto a series of cyclically repetitive pulses; switching circuits at each of said keyboard stations for deriving from said output circuits of the coding device a selected number of electrical pulses; a plurality of output circuits including pulse delay networks from each of said keyboard stations for receiving said selected pulses in predetermined sequence; an electronic decade accumulator connected with each of said output circuits; selector switch means connected with said output circuits at each keyboard station; an additional decade accumulator connected with each of said selector switch output circuits; and a totaling decade accumulator connected in parallel with each of said last named accumulators for determining a grand total in response to operation of said keyboard stations.

12. An electronic remote control system for numerical registering and counting as defined in claim 11 wherein two trigger circuits and associated gate tubes are connected at each keyboard station with the output circuits from said coding device for applying to each keyboard station a predetermined series of pulses in response to each operation thereof.

13. An electronic remote control system for numerical registering and counting comprising, in combination, a plurality of electronic decade accumulators having a predetermined location and each having a plurality of input circuits in connection with certain of the decade thereof; a time delay network in connection with certain of said decades for determining the timed sequence of operation thereof; a plurality of keyboards and switch means operated thereby remotely located with respect to said accumulators; an electrical pulse coding circuit for applying cyclically repetitive pulses in predetermined sequence to said accumulators through said keyboards and switch means; additional keyboards for selectively connecting each of said first named accumulators to any one of an additional group of accumulators; and time delay networks interposed between said keyboards for determining the sequence of operations of said accumulators in response to simultaneous operation of the several keyboards.

14. An electronic remote control system as defined in claim 13 wherein an electronic gate is provided in circuit with each keyboard and switching means therefor responsive to a coding pulse in the cyclically repetitive pulse sequence, and wherein the switching means provides a plurality of parallel connections for the coding circuit to a plurality of accumulator decades simultaneously through said time delay networks.

THOMAS KITE SHARPLESS.
EDWIN STUART EICHERT.

REFERENCES CITED

The following references are of record in the file of this patent:

UNITED STATES PATENTS

| Number    | Name        | Date           |
|-----------|-------------|----------------|
| 997,983   | Foote       | July 18, 1911  |
| 1,005,555 | Kettering   | Oct. 10, 1911  |
| 2,344,885 | Kozma et al.| Mar. 21, 1944  |
| 2,432,324 | May         | Dec. 9, 1947   |
| 2,442,428 | Mumma       | June 1, 1948   |
| 2,479,681 | Handley     | Aug. 23, 1949  |

FOREIGN PATENTS

| Number  | Country       | Date         |
|---------|---------------|--------------|
| 270,044 | Great Britain | May 6, 1927  |